(12) United States Patent
Tipton

(10) Patent No.: US 9,151,331 B2
(45) Date of Patent: Oct. 6, 2015

(54) HEAT BREAK COUPLING

(75) Inventor: Jon Tipton, Aurora, OH (US)

(73) Assignee: PYROTEK, INC., Spokane, WA (US)

( * ) Notice: Subject to any disclaimer, the term of this patent is extended or adjusted under 35 U.S.C. 154(b) by 806 days.

(21) Appl. No.: 12/442,179

(22) PCT Filed: Sep. 21, 2007

(86) PCT No.: PCT/US2007/020533
§ 371 (c)(1),
(2), (4) Date: Mar. 20, 2009

(87) PCT Pub. No.: WO2008/066599
PCT Pub. Date: Jun. 5, 2008

(65) Prior Publication Data
US 2010/0166493 A1   Jul. 1, 2010

Related U.S. Application Data

(60) Provisional application No. 60/846,577, filed on Sep. 22, 2006.

(51) Int. Cl.
*F16D 1/02* (2006.01)
*F16D 1/10* (2006.01)
*F16D 1/08* (2006.01)

(52) U.S. Cl.
CPC .............. *F16D 1/101* (2013.01); *F16D 1/0847* (2013.01); *F16D 2001/102* (2013.01); *F16D 2300/02* (2013.01); *Y10T 29/49995* (2015.01); *Y10T 403/21* (2015.01)

(58) Field of Classification Search
CPC ........................................................ F16D 1/02
USPC .............. 403/28, 305, 306, 293, 355; 464/17, 464/182
See application file for complete search history.

(56) References Cited

U.S. PATENT DOCUMENTS

| | | | | |
|---|---|---|---|---|
| 1,478,124 A | * | 12/1923 | Johnson | ........................ 403/306 |
| 3,355,910 A | | 12/1967 | Pruner | |
| 5,051,071 A | * | 9/1991 | Haentjens | ..................... 417/373 |
| 5,131,632 A | | 7/1992 | Olson | |
| 5,387,017 A | | 2/1995 | Gill | |
| 5,634,770 A | | 6/1997 | Gilbert et al. | |
| 6,254,340 B1 | | 7/2001 | Vild et al. | |
| 6,358,467 B1 | | 3/2002 | Mordue | |
| 6,451,247 B1 | | 9/2002 | Mordue et al. | |
| 6,709,234 B2 | * | 3/2004 | Gilbert et al. | .................. 415/200 |
| 6,977,059 B2 | | 12/2005 | Gilbert | |

* cited by examiner

*Primary Examiner* — Daniel Wiley
(74) *Attorney, Agent, or Firm* — Fay Sharpe LLP

(57) ABSTRACT

A coupling for a molten metal processing system to provide coupling for rotor/shaft systems which has a heat break to prevent heat flow to a motor. A cross sectional area reduction provides a restriction which reduces heat transmission through a conductive material to restrict heat flow to a motor, which will ultimately extend the life of the motor.

18 Claims, 2 Drawing Sheets

HEAT BREAK COUPLING

This application claims the benefit of U.S. Provisional Application No. 60/846,577, filed Sep. 22, 2006.

BACKGROUND

This invention relates generally to the art of processing and treating molten metal. More particularly, this invention relates to a new and improved coupling design for a molten metal processing system.

Molten metal processing equipment can usually be classified into several different types of systems. For example, degassing/flux injection, submergence and pumps are frequently used general categories.

Systems which fall into the degassing/flux injection category generally operate to remove impurities from molten metal. More specifically, these systems remove oxides in solution, release dissolved gases, such as hydrogen, from molten metal, and through floatation to remove suspended solid impurities. In order to achieve these functions, gases or fluxes are introduced into a molten metal bath which chemically reacts with the impurities to convert them to a form (such as a precipitate or a dross) that can be separated readily from the remainder of the molten metal.

Systems which fall into the submergence category generally operate to melt scrap metal, such as by-products of metal processing operations and aluminum beverage cans, in order to recover the scrap metal for productive use. In a typical submergence system, the scrap metal is introduced onto the surface of the molten metal and drawn downward or submerged within the molten metal where it is melted. In its melted form, the scrap metal is substantially ready for productive use The pump category can be further classified into three different types of systems including transfer pumps, discharge pumps, and gas-injection pumps. A transfer pump typically transfers molten metal from a furnace to a holding system or another furnace. A circulation pump transfers molten metal from one bath chamber to another bath chamber. A gas-injection pump circulates molten metal and adds a gas into the flow of molten metal. Although the present invention is particularly well suited for use with a gas-injection pump or degassing system, it must be appreciated that this invention may be used with any rotor/shaft system, including but not limited to the systems mentioned above.

Known molten metal processing apparatii of the foregoing types typically include the common feature of a motor carried by a motor mount, a shaft connected to the motor at an upper end, and an impeller or rotor connected at a lower end of the shaft. A coupling mechanism is used to connect the upper end of the shaft to the motor. The components are usually, but not limited to, manufactured from metals and/or refractory material, such as graphite or ceramic. In operation, the motor drives the coupling/shaft/rotor system about its central vertical axis. The rotating impeller may serve any number of functions. For example, in a submergence system the impeller may draw molten metal downwardly to assist in the submergence of scrap materials deposited on the surface of the melt. In a pump system, the impeller may be contained within a housing to effect a pumping action on the metal. In a degassing/flux injection system, the introduction of gas or flux into the molten metal is done via a passage located in the coupling/shaft/rotor system.

An important feature of impeller/shaft systems is the coupling mechanism which connects the upper end of the shaft to the motor. Typically, the coupling mechanism is made from a metal or other heat conductive material, for example stainless steel. Since the shaft/impeller system is typically immersed in a molten metal bath, the shaft temperature increases and thereby transfers heat to the coupling mechanism via conduction. Heat from the coupling mechanism can then be transferred to the output shaft of the motor. This heat can be detrimental to the performance of the motor.

Heat conduction is the transmission of heat across matter. Conduction is heat transfer by means of molecular agitation within a material without any motion of the material as a whole. If one end of a metal rod is at a higher temperature, then kinetic energy will be transferred down the rod toward the colder end because the higher speed particles will collide with the slower ones with a net transfer of energy to the slower ones. Heat transfer is always directed from a higher to a lower temperature. Dense substances typically are fair conductors; metals in general are good conductors. The law of heat conduction, also know as Fourier's law, states that the time rate of heat flow Q through a body is proportional to the gradient of temperature difference:

$$Q = KA\frac{\Delta T}{\Delta x}$$

A is the transversal surface area, $\Delta x$ is the thickness of the body of matter through which the heat is passing, K is a conductivity constant dependent on the nature of the material and its temperature, and $\Delta T$ is the temperature difference through which the heat is being transferred. This law forms the basis for the derivation of the heat equation.

Accordingly, a need exists in the art of processing molten metal to provide a coupling design for rotor/shaft systems which has a heat break to prevent heat flow to a motor. The present invention achieves such advantages and others. This disclosure deals with a cross sectional area reduction heat break which provides a restriction to prevent heat transmission through a conductive material.

BRIEF DESCRIPTION

A coupling for connecting a motor to a shaft in a molten metal processing system to restrict heat flow to a motor, which will ultimately extend the life of the motor.

DETAILED DESCRIPTION

Figure 1:
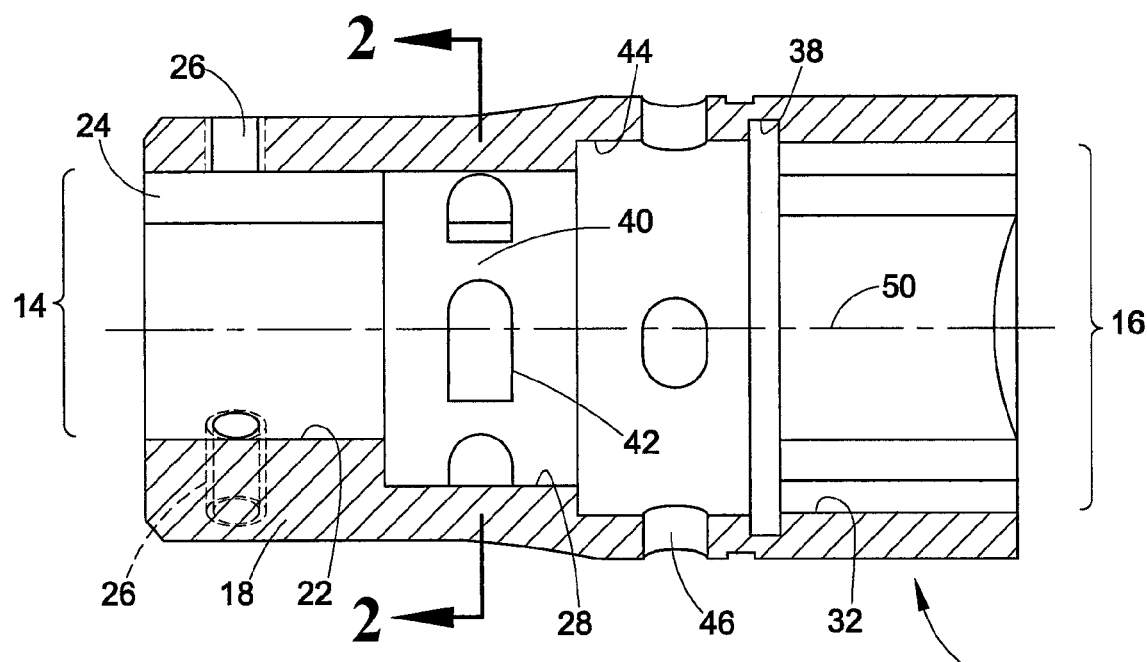
FIG. 1 is a side cross-sectional view of a heat break coupling.

Referring to FIG. 1, and in accordance with one aspect of the present invention, a coupling body 10 for a molten metal processing system includes a generally annular sidewall 18, a first opening 14 and a second opening 16. The coupling 10 can be manufactured in a one-piece or multiple-piece construction, and it has a longitudinal axis of rotation 50 extending through the coupling 10 from the first opening 14 to the second opening 16.

Figure 3:
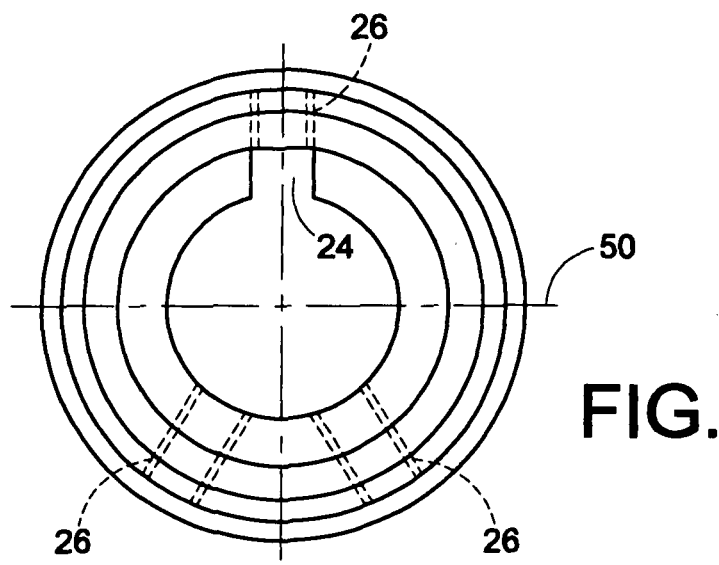
FIG. 3 is a left side view of the first opening of the coupling.

The first opening 14 is configured to receive a driver axle, such as an output shaft (not shown), but not limited to, a motor (not shown), and the second opening 16 is configured to receive a driven axel such as, but not limited to, an impeller shaft (not shown). U.S. Pat. No. 5,634,770, herein incorporated for reference, shows a molten metal pump with a motor and impeller. The coupling 10 includes a first upper cavity 22, defined in part by the first opening 14, which is configured to receive the motor output shaft (not shown). With reference to FIG. 3, the coupling 10 further includes a key way 24 disposed in the first upper cavity 22 and at least one opening 26 (three are shown) for a fastener, such as, but not limited to, a set screw. In the depicted embodiment, the key way 24 is parallel, but not limited to, to the longitudinal axis 50 and receives a key to facilitate attaching the motor output shaft (not shown) to the coupling 10. The openings 26 are disposed perpendicular (e.g., radial) to the longitudinal axis 50. As earlier indicated, the openings 26 receive fasteners which will allow the motor output shaft (not shown) to be attached into place within the first upper cavity 22 of the coupling 10.

Figure 4:
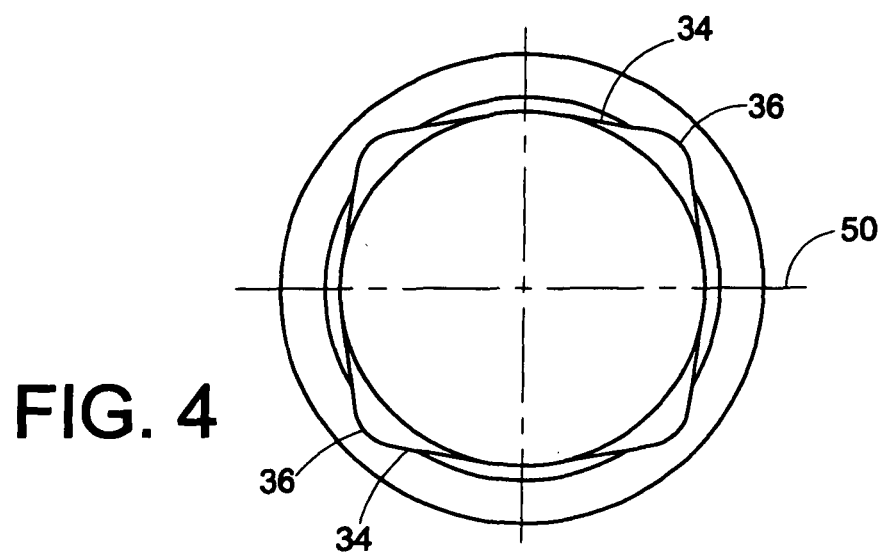
FIG. 4 is a right side view of the second opening of the coupling.

With further reference to FIG. 1, there is an upper intermediate cavity 28 disposed adjacent to the first upper cavity 22. The upper intermediate cavity 28 has, but is not limited to, a larger diameter than the first upper cavity 22, and has, but is not limited to, a smaller diameter than that of the intermediate cavity 44, which is disposed on the other side of the upper intermediate cavity 28. The intermediate cavity 44 is disposed between the upper intermediate cavity 28 and the lower intermediate cavity 38. The lower intermediate cavity 38 has a larger diameter than the intermediate cavity 44. The intermediate cavity 44 also has the same outer diameter as the lower cavity 32; however, the lower cavity is not required to be the cylindrical shape as illustrated in FIG. 4. In addition, the intermediate cavity has at least one opening 46 (four are shown) for a fastener.

The coupling 10 further includes a lower cavity 32 into which the impeller shaft (not shown) is fitted. Now referring to FIG. 4, the lower cavity 32 includes, but is not limited to, four curved inner sidewall surfaces 34 and four rounded corners 36 equidistantly spaced from the axis 50 that connect the surfaces 34. This configuration helps facilitate mating to and driving of the impeller shaft 30 while allowing for rotation. The opening in the impeller (not shown) can be formed in a modified "square drive" configuration. In particular, the opening can include curved sidewall surfaces 34 having a relatively large radius, and rounded corners 36 having a relatively small radius. As illustrated in FIG. 4, four sidewall surfaces 34 are provided, with four corners 36 connecting the adjacent sidewall surfaces 34. The lower cavity 32 is provided with matching sidewall portions and corners, wherein adjacent sidewall portions are generally at right angles, so as to snugly fit within the opening defined by the sidewall surfaces 34 and the corners 36 of the impeller (not shown).

Figure 2:
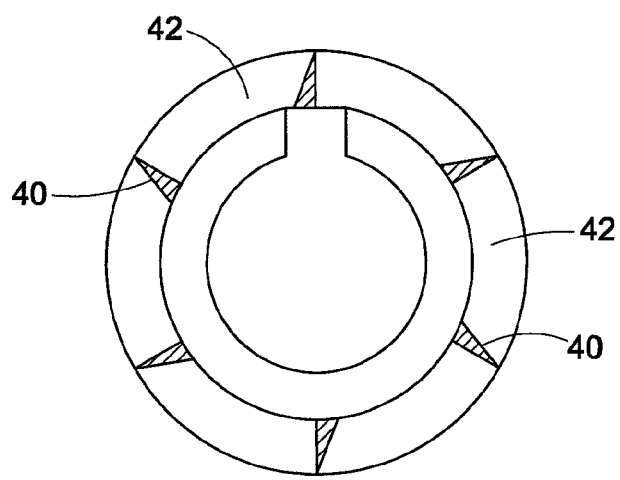
FIG. 2 is a sectional view as taken along line A-A of FIG. 1 showing a cross-section of the heat break of the coupling.

In addition, with reference to FIG. 2, the coupling 10 has, but is not limited to, six columns 40 of material equally spaced from one another. The columns 40 are located on the outer diameter of the coupling body 10 in a radial pattern from the axis 50. Between each column 40 is a slotted area 42 where material has been removed from the generally annular side wall 18 of the coupling 10 in order to form the columns 40 in the coupling 10. These slots 42, where portions of material has been removed, are disposed between the first opening 14 and the second opening 16 to reduce heat flow from the impeller shaft (not shown) to the motor (not shown) through the coupling 10. It is also feasible for the slots to extend only partially through the side wall. As discussed above in the Background regarding Fourier's law, by removing material between the columns 40 to form the slots 42, the mass of the body of matter through which the heat is passing is reduced, which in turn makes it more difficult for the heat to flow through the coupling 10 and into the motor (not shown). In the coupling 10 are slots 42 located towards the center of the coupling 10 closer to the first opening 14. The mass in this area is reduced because of the slots 42 and is where the heat break is located to prevent heat from wicking up from a lower cavity 32 of the coupling 10 to a first upper cavity 22 of the coupling 10, which would then be transmitted to the motor (not shown) via heat conduction. This reduction in the mass of the coupling 10 prevents the heat from being able to travel up the coupling 10 towards the motor (not shown), which is due to portions 42 of the coupling 10 that have been removed.

Obviously, modifications and alterations will occur to others upon reading and understanding the preceding detailed description. It is intended that the exemplary embodiment be construed as including all such modifications and alterations in so far as they come within the scope of the appended claims or the equivalents thereof.

What is claimed is:

1. A coupling mechanism for connecting an associated driver shaft to an associated driven shaft in a molten metal processing system comprising a one-piece, monolithic body having a first opening configured to receive the associated driver shaft, a second opening configured to receive the associated driven shaft, the body further defining a plurality of circumferentially spaced, longitudinally extending slots formed by removing material from a radial wall between the first opening and the second opening, the body adjacent to the first opening having a terminal portion having a first outer diameter and the body adjacent to the second opening having a terminal portion having a second outer diameter greater than the first outer diameter, the body further including a step region between the first opening and the second opening wherein the diameter is reduced in the direction of the first opening.

2. The coupling mechanism of claim 1, wherein the first opening includes a keyway.

3. The coupling mechanism of claim 1, wherein the second opening includes four concave sidewall portions and rounded corners.

4. The coupling mechanism of claim 1, wherein a plurality of columns join a first end of the body to a second end of the body and define the slots.

5. The coupling mechanism of claim 4, wherein the columns have a cross sectional shape that is one of a triangle and a rectangle prism.

6. The coupling mechanism of claim 4, wherein the columns run parallel or perpendicular to a rotational axis of the body.

7. The coupling mechanism of claim 1, wherein at least one of the plurality of slots extends partially through a side wall of the body.

8. The coupling mechanism of claim 1, wherein the plurality of slots extend completely through a side wall of the body.

9. The coupling mechanism of claim 1, wherein the body includes at least a first upper cavity, an upper intermediate cavity and an intermediate cavity such that the upper intermediate cavity is axially positioned between the first upper cavity and the intermediate cavity, the first upper cavity is adapted to receive the associated driver shaft and the intermediate cavity is adapted to receive the associated driven shaft.

10. The coupling mechanism of claim 9, wherein the upper intermediate cavity has a larger cross sectional area than the first upper cavity and the intermediate cavity has a larger cross sectional area than the upper intermediate cavity.

11. The coupling mechanism of claim 9, wherein the upper intermediate cavity includes columns to reduce heat flow from the second opening to the first opening.

12. The coupling mechanism of claim 11, wherein the upper intermediate cavity includes at least six columns oriented in a radial pattern from an axis of rotation.

13. The coupling mechanism of claim 9, wherein the upper intermediate cavity includes a plurality of columns that are radially spaced about the upper intermediate cavity and define a plurality of slots.

14. The coupling mechanism of claim 1, wherein the second diameter of the body adjacent to the second opening comprises the widest portion of the coupling.

15. A coupling mechanism for connecting a driver system to an impeller shaft of a molten metal pump, the coupling mechanism comprising a one-piece, monolithic body having a first cavity configured to receive an associated output shaft of an associated driver system and a second cavity axially spaced from the first cavity, the second cavity being defined by a sidewall including a plurality of circumferentially spaced, longitudinally extending slots formed by removing material from the sidewall, and a third cavity to accept a driven impeller shaft, the third cavity is axially spaced from the second cavity, and wherein a terminal portion of a sidewall defining said third cavity has an outer cross-sectional area greater than an outer cross-sectional area of a terminal portion of a sidewall defining said first cavity.

16. A method of inhibiting heat flow from a driven impeller shaft to a motor through a one-piece, monolithic coupling comprising the steps of:
attaching a motor output shaft to the coupling at a first opening thereof, the first opening being defined by a body having a first outer diameter;
attaching an impeller shaft to the coupling at a second opening thereof, opposite the first opening, the second opening being defined by a body having a second outer diameter greater than the first outer diameter; and
removing material from a radial wall of the coupling between the first and second openings resulting in circumferentially spaced, longitudinally extending columns of material radially located around the coupling.

17. The method of claim 16, wherein the driven impeller shaft is attached to the coupling by one of a key and at least one or multiple fasteners.

18. The method of claim 16, wherein a driver motor shaft is attached to the coupling by one of a key and at least one or multiple fasteners.

* * * * *